Patented Aug. 31, 1948

2,448,175

UNITED STATES PATENT OFFICE 2,448,175

EXTRACTION OF RUTIN

Roderick Koenig Eskew, Glenside, Pa., assignor to the United States of America as represented by the Secretary of Agriculture No Drawing. Application August 9, 1946, Serial No. 689,348

3 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the extraction of rutin from rutin-bearing plants, and has among its objects the simplification of known processes.

Rutin is a drug of the flavanol group having therapeutic values, particularly in the reduction of capillary fragility. It occurs in a wide variety of plants, but at present its best known commercial source is from buckwheat.

According to one known process for its purification, fresh buckwheat plants are extracted with ethyl alcohol, and the resulting aqueous alcohol extract is then evaporated to remove and recover the alcohol. The resulting product is principally an aqueous slurry of partially crystallized rutin and tarry impurities consisting mainly of plant fats and resins. This slurry is allowed to stand to crystallize the rutin more completely, and is then filtered and dried. The tarry impurities are then removed from the dried mass by repeated extractions with benzol, in which the rutin is not soluble, and the remaining rutin is further purified by repeated crystallizations from water.

According to another known process, more fully set forth in application Serial No. 687,504, filed July 31, 1946, now Patent No. 2,425,094, by Edward L. Griffin, Jr., the rutin and tarry impurities are first removed from dried buckwheat meal or dried buckwheat leaf meal by extraction with aqueous ethyl alcohol, the process thereafter following that outlined above for extraction from the fresh plants.

With both these processes, the tarry impurities are removed from the aqueous slurry containing them and the rutin by drying followed by repeated extractions with benzol. This involves both a health and a fire hazard. Furthermore, relatively large quantities of benzol are required, since the benzol-soluble materials are many times the weight of the rutin itself. Also, at least three repeated extractions with benzol are generally necessary to remove the impurities.

The present process provides for elimination of these tarry impurities without employing the expensive and hazardous solvents.

In general, according to the invention, either fresh buckwheat plants, dried buckwheat meal or dried buckwheat leaf meal is extracted with either ethyl alcohol or aqueous ethyl alcohol, and the extract is evaporated to remove the alcohol in the manner explained above. Then, instead of permitting the rutin to crystallize completely, water is added to the slurry in sufficient quantity to dissolve all the rutin when the mixture is brought to a boil. The mixture is then boiled for about five minutes, thus dissolving the rutin and causing the tarry mixture of fats and resins to coalesce, which tarry mixture is then substantially removed by filtration from the hot aqueous solution of the rutin. The rutin is then removed from the aqueous solution by repeated crystallizations, the aqueous solution of rutin each time being brought to the boiling point and boiled for about five minutes and filtered, any remaining tarry fats and resins being thus progressively removed. The rutin from the final crystallization contains only traces of benzol-soluble mixture of fats and resins. If desired, these last traces of impurities may be removed by giving the dried rutin crystals a wash in a small amount of benzol, merely sufficient to give a fluid slurry of crystals in the benzol.

The following is an example of the process applied to an alcoholic extract of fresh buckwheat.

Example I

One hundred gallons of an alcoholic extract of fresh buckwheat having a strength of approximately 67% by weight ethyl alcohol and containing about 1 lb. of rutin was subjected to evaporation until the alcohol was substantially eliminated (until the temperature reached about 210° F.). The residue in the evaporator consisted of about 20 gallons of an aqueous slurry of rutin crystals and a tarry mixture consisting essentially of fats and resins. Sufficient hot water (23 gallons) was added to dissolve all the rutin. The mixture was then boiled for five minutes to coalesce the tarry fats and resins. One and one-half pounds of filter aid was then added to the boiling solution, and it was filtrated through paper, backed with cloth, to remove most of the tarry fats and resins. The filtrate was cooled and allowed to stand for 48 hours to crystallize the rutin.

The crude rutin was filtered off and redissolved in 23 gallons of hot water and boiled for approximately five minutes to coalesce the carried-over tarry fats and resins. It was then filtered hot, allowed to crystallize, and the crystals filtered off. This step was repeated once more in the same manner as just described, except 1½ lbs. of silica gel was added to the solution before boiling, the purpose of the silica gel being set forth in application Serial No. 685,632, filed July 23, 1946, by James F. Couch et al.

The crystals from this third crystallization were dried at a temperature not exceeding 266° F. They contained only a trace of benzol solubles. To remove this trace, the rutin crystals were given two successive washes using ¾ of a gallon of benzol in each wash. After drying, the rutin obtained was sufficiently pure for medicinal use.

All water used in dissolving the rutin must be kept at a pH below 7 to prevent chemical modification of the product. This can be accomplished by adding an acid such as sulfuric acid, when necessary.

The following is an example of the process applied to an aqueous alcohol extract of dried buckwheat leaf meal.

*Example II*

Sixty gallons of an aqueous alcoholic extract of dried buckwheat leaf meal having an alcoholic strength of approximately 62% by weight and containing approximately 1 lb. of rutin was subjected to evaporation until the alcohol was substantially eliminated. Thereafter, the process was carried out as in Example I with substantially similar results.

Having thus described the invention, what is claimed is:

1. A process of extracting rutin comprising extracting rutin-bearing plants with alcohol, evaporating the extract to substantially remove the alcohol, adding sufficient water at a pH below 7.0 to the evaporated extract to dissolve the rutin at boiling temperature, boiling the mixture to dissolve the rutin and to coalesce the tarry mixture of fats and resins, and mechanically removing the coalesced tarry mixture from the aqueous solution of the rutin.

2. The process of claim 1 in which the rutin-bearing plant is buckwheat.

3. A process of removing a tarry mixture of plant fats and resins from a rutin-bearing plant extract containing rutin, the mixture of plant fats and resins and sufficient water at a pH below 7.0 to dissolve the rutin at boiling temperature, comprising boiling the extract to dissolve the rutin and to coalesce the tarry mixture, and mechanically removing the coalesced tarry mixture from the aqueous solution of the rutin.

RODERICK KOENIG ESKEW.

REFERENCES CITED

The following references are of record in the file of this patent:

Weiss, Pharm. Centr., 1842, page 903.
Schunck, J. Chem. Soc., vol. 53, pages 262-267 (1888).